United States Patent [19]
Blumenthal

[11] 3,870,788

[45] Mar. 11, 1975

[54] HAFNIUM-TITANIUM-CALCIUM-OXYGEN PRODUCT

[75] Inventor: Warren B. Blumenthal, North Tonawanda, N.Y.

[73] Assignee: NL Industries, Inc., New York, N.Y.

[22] Filed: Nov. 5, 1973

[21] Appl. No.: 413,179

[52] U.S. Cl.............. 423/598, 423/593, 106/299, 106/306
[51] Int. Cl.................... C01g 23/00, C09c 1/36
[58] Field of Search............... 106/299, 306, 309; 423/593, 598

[56] References Cited
UNITED STATES PATENTS

| | | | |
|---|---|---|---|
| 2,033,707 | 3/1936 | Harshaw et al. | 423/598 |
| 2,346,296 | 4/1944 | Espenschied | 106/299 |
| 2,936,216 | 5/1960 | Merker | 423/598 |

*Primary Examiner*—Delbert E. Gantz
*Assistant Examiner*—J. V. Howard
*Attorney, Agent, or Firm*—Ashlan F. Harlan, Jr.

[57] ABSTRACT

A novel, crystalline reaction product having usefulness as a white pigment is produced by calcining, in an oxidizing atmosphere and to a temperature of from about 800°C to about 1600°C, a chemically homogeneous conglomerate that consists essentially of Hf, Ti, Ca, and O and at least one thermally fugitive ligand per atom of metal component. The Hf, Ti and Ca are preferably present in a 3:1:1 atomic ratio and the oxygen is present in amount sufficient to form the highest oxides of the three metals.

6 Claims, No Drawings

HAFNIUM-TITANIUM-CALCIUM-OXYGEN PRODUCT

BACKGROUND OF THE INVENTION

This application relates to the production of hafnium-titanium-calcium-oxygen product that has usefulness as a white pigment.

It has been found that a useful, novel, crystalline compound can be obtained by calcining in an oxidizing atmosphere, to a temperature of at least about 600°C a chemically homogeneous conglomerate that consists essentially of Zr, Ti, Ca, and O and at least one thermally fugitive ligand per atom of metal component. In forming the novel compound the Ti, Zr, and Ca are preferably used in a 1:3:1 atomic ratio and the oxygen is present in an amount sufficient to form the highest oxides of the three metals. When finely divided the compound provides a white pigment which has an unexpectedly good combination of desirable pigmentary properties.

SUMMARY OF THE INVENTION

According to the present invention, a novel, crystalline reaction product having usefulness as a white pigment is produced by calcining in an oxidizing atmosphere a chemically homogeneous conglomerate that consists essentially of Hf, Ti, Ca, and O and at least one thermally fugitive ligand per atom of metal component. The resulting reaction product, which has a composition that corresponds to the formula $CaTiHf_3O_9$, is a mixture of phases, a major component of which exhibits an x-ray diffraction pattern that closely resembles the x-ray diffraction pattern of the crystalline compound, mentioned above, containing zirconium, titanium, and calcium. Although the novel reaction product is formed at temperatures in the range from about 800°C to about 1600°C, a calcining temperature of from about 1000°C to about 1200°C is preferred as being more economical and producing a pigment of superior properties.

In the conglomerate employed in forming the present novel product the Hf, Ca, and Ti are preferably present in a 3:1:1 atomic ratio and the oxygen is present in amount sufficient to form the highest oxides of the three metals.

A "chemically homogeneous" conglomerate as the term is used herein is one in which the distances separating the metal-oxygen moieties contained therein are of the order of molecular distances typical of molecules or ions of salts. A "thermally fugitive" ligand as the term is used herein is one which, under the conditions of the present process, volatilizes as such or is wholly converted with or without oxidation, into products that volatilize.

DESCRIPTION OF AN EMBODIMENT

Example 1

An aqueous solution of calcium ammonium lactatohafnate of composition $Ca_{0.33}(NH_4)$ 1.34 H HfOH $(OCHCH_3CO_2)_3$ was formed by dissolving 1 mole of trilactatohafnic acid in water with 0.33 moles of calcium hydroxide and 1.34 moles of ammonium hydroxide. Trilactatotitanic acid in solution was added to the first solution in an atomic ratio of Ti:Hf of 1:3. The trilactatotitanic acid was prepared by stirring 0.15 mole of oxalic acid into an aqueous solution of titanium oxychloride containing approximately 0.1 gram-atom of Ti, enough water being used to ensure complete solution of the oxalic acid, and then slowly pouring the solution into about four times its volume of water while simultaneously adding a 50 percent $NH_4OH$ solution at such a rate as to maintain the pH of the mixture at about 9.0. The resulting precipitate after filtering and washing with distilled water to remove ammonium chloride was dissolved in an 85 percent aqueous solution of lactic acid $(H_6C_3O_3)$, containing 0.37 mole of lactic acid, to give a solution of trilactatotitanic acid.

The two solutions were thoroughly mixed until the mixture was homogeneous and the mixture was then dried at 90°C to form an amorphous, glassy, "chemically homogeneous" conglomerate. The conglomerate was placed in a zircon sagger and heated in air in an electric furnace for 3 hours at 1000°.

The reaction product obtained when the thermally fugitive ligands $NH_3$, $H_2O$, and lactato were removed by the heating was a coherent but easily crushed compact. On crushing the product, there resulted a crystalline, white powder. X-ray diffraction analysis of this powder showed diffraction peaks corresponding to monoclinic hafnium dioxide, calcium hafnate and a phase of the same morphology as the crystalline compound containing zirconium, titanium, and calcium mentioned above.

A similar process for the production of the novel reaction product of the present invention involves the calcination of a chemically homogeneous, glassy conglomerate obtained by evaporating to dryness a mixture of solutions of calcium ammonium triglycolatohafnate and titanium glycolate in a 3:1 mol ratio.

The novel reaction product of this invention can be used as a pigment. Such use is illustrated in the following example.

Example 2

An ink was made by intimately blending 4 parts of the white powder obtained from the process of Example 1 with 1 part of boiled linseed oil. This ink was applied to paper and was found to have good covering power and a clean, white appearance when dry.

Since the novel reaction product is quite insoluble in organic materials and water, it may be employed as a pigment in coating compositions with a wide variety of vehicles and in organic polymers and other plastic materials. When intended for pigment use, the novel reaction product of this invention is desirably prepared from raw materials free from compounds, e.g. iron compounds, that would tend to produce discoloration of the white pigment.

Parts and percentages referred to herein are by weight except as otherwise indicated.

I Claim:

1. A process for producing a crystalline hafnium-titanium-calcium-oxygen reaction product having a composition corresponding substantially to the formula $CaTiHf_3O_9$ which comprises calcining in an oxidizing atmosphere and to a temperature of at least about 800°C, a chemically homogeneous, glassy conglomerate which consists essentially of Ti, Ca, Hf, O, and at least one thermally fugitive ligand per atom of metal content, the atomic ration of Ti, Ca, Hf therein being approximately 1:1:3 and the oxygen being present in the amount necessary to form the highest oxides of the three metals, and said calcining being for a period of at least 3 hours at 800°C.

2. A process as set forth in claim 1 in which said chemically homogeneous conglomerate is formed by evaporation of a solution containing said metals, oxygen and thermally fugitive ligands.

3. A process as set forth in claim 2 in which said calcining is at a temperature in the range from about 800°C to about 1600°C.

4. A process as set forth in claim 2 in which said calcining is at a temperature in the range from about 1000°C to about 1200°C.

5. A process as set forth in claim 2 in which said solution comprises lactates of said metals.

6. The reaction product resulting from the process of claim 1.

* * * * *